United States Patent
Li et al.

(10) Patent No.: US 11,287,921 B2
(45) Date of Patent: Mar. 29, 2022

(54) CONDUCTIVE LAMINATED STRUCTURE AND METHODS FOR MANUFACTURING THE SAME, AND TOUCH-CONTROL DISPLAY DEVICES

(71) Applicant: KunShan Go-Visionox Opto-Electronics Co., Ltd., Kunshan (CN)

(72) Inventors: Weiguo Li, Kunshan (CN); Shengzu Zhu, Kunshan (CN); Guizhou Qiao, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 185 days.

(21) Appl. No.: 16/713,024

(22) Filed: Dec. 13, 2019

(65) Prior Publication Data

US 2020/0117334 A1 Apr. 16, 2020

Related U.S. Application Data

(63) Continuation of application No. PCT/CN2018/119003, filed on Dec. 3, 2018.

(30) Foreign Application Priority Data

Jun. 30, 2018 (CN) .......................... 201810703208.8

(51) Int. Cl.
*G06F 3/041* (2006.01)
(52) U.S. Cl.
CPC .................. *G06F 3/04164* (2019.05); *G06F 2203/04103* (2013.01)
(58) Field of Classification Search
CPC ....... G06F 3/04164; G06F 2203/04103; G06F 3/041; G06F 3/0412
See application file for complete search history.

(56) References Cited

U.S. PATENT DOCUMENTS

2014/0162057 A1   6/2014  Cho et al.

FOREIGN PATENT DOCUMENTS

| CN | 103713794 A | 4/2014 |
| CN | 203930769 U | 11/2014 |

(Continued)

OTHER PUBLICATIONS

Refusal Decision of Chinese Application No. 201810703208.8.
(Continued)

*Primary Examiner* — Jonathan A Boyd
(74) *Attorney, Agent, or Firm* — Kilpatrick Townsend & Stockton

(57) ABSTRACT

The present application provides a conductive laminated structure and a method for manufacturing the same, and a touch-control display device, wherein, an opening is formed in a conductive layer after the conductive layer is formed on a substrate, so that more of the metal nanowires in a metal nanowire conductive layer can be exposed out of the surface of an adhesion enhancement layer and get in contact with a signal connection layer; furthermore, at least part of the signal connection layer is embedded into the opening along the thickness extending direction, thus ensuring the adhesiveness while enlarging the lap-jointed area of the signal connection layer with the metal nanowire conductive layer, which in turn reduces impedance and increases conductivity, and thereby further reduces response time; thus ensuring the conductivity while reducing the overall area percentage of the bezel area, so as to meet the design requirement for a narrow bezel.

19 Claims, 7 Drawing Sheets

(56) References Cited

FOREIGN PATENT DOCUMENTS

| CN | 104850252 | A | 8/2015 | | |
|---|---|---|---|---|---|
| CN | 105094441 | A | 11/2015 | | |
| CN | 105183246 | * | 12/2015 | ............ | G06F 3/044 |
| CN | 105183246 | A | 12/2015 | | |
| CN | 105204695 | * | 12/2015 | ............ | G06F 3/044 |
| CN | 105204695 | A | 12/2015 | | |
| CN | 106155403 | * | 11/2016 | ............ | G06F 3/041 |
| CN | 106155403 | A | 11/2016 | | |
| CN | 107783697 | A | 3/2018 | | |
| CN | 108897449 | A | 11/2018 | | |
| JP | 2013156773 | A | 8/2013 | | |

OTHER PUBLICATIONS

International Search Report dated Mar. 28, 2019 in the corresponding international application(application No. PCT/CN2018/119003).
CN Second Office Action dated Mar. 19, 2020 in the corresponding CN application(applcation No. 201810703208.8).
Written Opinion for application No. PCT/CN2018/119003.
First Office Action of Chinese Application No. 201810703208.8.

* cited by examiner

CONDUCTIVE LAMINATED STRUCTURE AND METHODS FOR MANUFACTURING THE SAME, AND TOUCH-CONTROL DISPLAY DEVICES

CROSS-REFERENCES TO RELATED APPLICATIONS

The present application is a continuation application to PCT Application No. PCT/CN2018/119003, filed Dec. 3, 2018, which claims priority to Chinese Patent Application No. 201810703208.8, filed Jun. 30, 2018. Both applications are incorporated by reference herein for all purposes.

TECHNICAL FIELD

The present disclosure relates to a technology of manufacturing a touch-control display device.

BACKGROUND

The touch-control electrode of a conventional touch-control display device is usually made of a material of tin indium oxide (ITO).

Metal nanowires, due to their excellent conductivity and nano-scale size effect, have outstanding light transmittance and flexure endurance, and therefore can be used as the material of a touch-control electrode in replacement of ITO to realize a touch-control display device based on metal nanowires.

SUMMARY

The present application is aimed at providing a conductive laminated structure and a method for manufacturing the same, and a touch-control display device, so that a touch-control display device based on metal nanowires can satisfy the requirement for adhesiveness and the requirement for conductivity at the same time.

To this end, the embodiments of the present application provide a conductive laminated structure comprising:

a conductive layer, comprising a metal nanowire conductive layer and an adhesion enhancement layer, wherein the adhesion enhancement layer and the metal nanowire conductive layer are at least partially embedded into each other along a thickness extending direction of the adhesion enhancement layer; and a signal connection layer, located on the conductive layer, wherein the conductive layer is provided with an opening, and at least part of the signal connection layer is embedded into the opening along a thickness extending direction of the signal connection layer.

Optionally, one side of a vertical section of the opening near the signal connection layer has a size larger than that of the other side of the vertical section of the opening away from the signal connection layer.

Optionally, the vertical section of the opening has a trapezoidal shape.

Optionally, the vertical section of the opening has a rectangular shape.

Optionally, a plurality of the openings are provided and evenly distributed in the conductive layer.

Optionally, the plurality of the openings are distributed in multiple rows or columns.

Optionally, the depth of the opening is smaller than or equal to the thickness of the conductive layer.

Optionally, the metal nanowire conductive layer includes: a matrix; and a plurality of metal nanowires embedded in the matrix; the plurality of metal nanowires are lap jointed with one another to form a conductive network.

Optionally, the material of the adhesion enhancement layer is at least one of high molecular polymer, resin, transparent optical adhesive, oxides, and photoresist analogues.

Optionally, the material of the signal connection layer is at least one of silver, gold, tin indium oxide, metallic sieves and graphene.

Optionally, the material of the metal nanowires is gold, silver, platinum, copper, cobalt or palladium.

The embodiments of the present application further provide a method for manufacturing the conductive laminated structure, comprising: forming a conductive layer comprising a metal nanowire conductive layer and an adhesion enhancement layer, wherein the adhesion enhancement layer and the metal nanowire conductive layer are at least partially embedded into each other along a thickness extending direction of the adhesion enhancement layer; forming an opening in the conductive layer; and forming a signal connection layer on the conductive layer, wherein at least part of the signal connection layer is embedded into the opening along a thickness extending direction of the signal connection layer.

Optionally, the step of forming the metal nanowire conductive layer comprises: coating a metal nanowire solution on a substrate; and curing the metal nanowire solution coated on the substrate to form the metal nanowire conductive layer.

Optionally, the step of forming the adhesion enhancement layer includes: coating an optical clear adhesive solution on the metal nanowire conductive layer by a spraying process or a printing process; and performing heating and drying to cure the optical clear adhesive solution to form the adhesion enhancement layer.

Optionally, the opening in the conductive layer is formed by a method selected from at least one of dry etching, wet etching and laser etching.

Optionally, the signal connection layer is formed on the conductive layer by a printing process.

The embodiments of the present application further provide a touch-control display device, including:

a substrate;

a conductive laminated structure, located on the substrate; wherein, the conductive laminated structure comprises:

a conductive layer, comprising a metal nanowire conductive layer and an adhesion enhancement layer, the adhesion enhancement layer and the metal nanowire conductive layer being at least partially embedded into each other along a thickness extending direction of the adhesion enhancement layer; and a signal connection layer, located on the conductive layer, the conductive layer being provided with an opening, at least part of the signal connection layer being embedded into the opening along a thickness extending direction of the signal connection layer.

Optionally, the substrate includes a viewable area and a bezel area surrounding the viewable area, the signal connection layer and the opening are provided in the bezel area.

Optionally, the signal connection layer and the opening are also provided in the viewable area.

Optionally, the touch-control display device further includes a cover plate and a bonding layer, the bonding layer is located between the conductive laminated structure and the cover plate so as to bond the conductive laminated structure and the cover plate together.

In the method for manufacturing a conductive laminated structure provided by the embodiments of the present application, the opening is formed in the conductive layer after the conductive layer is formed on the substrate, so that more of the metal nanowires in the metal nanowire conductive layer can be exposed out of the surface of the adhesion enhancement layer and get in contact with the signal connection layer; furthermore, at least part of the signal connection layer is embedded into the opening along a thickness extending direction of the signal connection layer, thus ensuring the adhesiveness while enlarging the lap jointed area of the signal connection layer with the metal nanowire conductive layer, which in turn reduces impedance and increases conductivity, and thereby further reduces response time.

Furthermore, the opening being located in a bezel area of the substrate can increase the effective lap jointed area of the signal connection layer with the metal nanowire conductive layer in the bezel area, thus ensuring the conductivity while reducing the overall area percentage of the bezel area, so as to meet the design requirement for a narrow bezel.

DETAILED DESCRIPTION OF THE INVENTION

Applicants have found that, the existing touch-control display devices based on metal nanowires are not able to meet the requirement for adhesiveness and the requirement for conductivity at the same time.

Currently, in the preparation process of metal nanowires in a touch-control display device, usually, a metal nanowire solution is directly coated on a substrate to form a metal nanowire conductive layer. However, the metal nanowire conductive layer, due to properties of its material and processing, needs to be coated with an adhesion enhancement layer for protection, so that the metal nanowire conductive layer is closely bonded with the substrate. However, after coating the adhesion enhancement layer, only some of the metal nanowires can be exposed out of the adhesion enhancement layer to be lap-jointed with a signal connection layer, resulting in a small lap jointed area of the metal nanowires with the signal connection layer. Therefore, in an attempt to ensure the conductivity, it is required to increase the lap-jointed width of the metal nanowire conductive layer with the signal connection layer, i.e., increase the overall width percentage of the bezel, when designing a conductive laminated structure.

A method for manufacturing a conductive laminated structure is provided in an embodiment of the present application, wherein an opening is formed in the conductive layer after the conductive layer is formed on the substrate, so that more of the metal nanowires in the metal nanowire conductive layer can be exposed out of the surface of the adhesion enhancement layer and get in contact with the signal connection layer; furthermore, at least part of the signal connection layer is embedded into the opening along a thickness extending direction of the signal connection layer, thus ensuring the adhesiveness while enlarging the lap jointed area of the signal connection layer with the metal nanowire conductive layer, which in turn reduces impedance and increases conductivity, and thereby further reduces response time.

Furthermore, the opening being located in a bezel area of the substrate can increase the effective lap jointed area of the signal connection layer with the metal nanowire conductive layer in the bezel area, thus ensuring the conductivity while reducing the overall area percentage of the bezel area, so as to also meet the design requirement for a narrow bezel.

Specific implementation ways of the present application will be described with more details as below in conjunction with the schematic diagrams. According to the following description and claims, the advantages and features of the present application will be made clearer. It should be noted that, the drawings, which are drawn in a simplified form and not exactly drawn to scale, are only used for the purpose of assisting to explain the embodiments of the present application in an easy and clear way.

Figure 3:
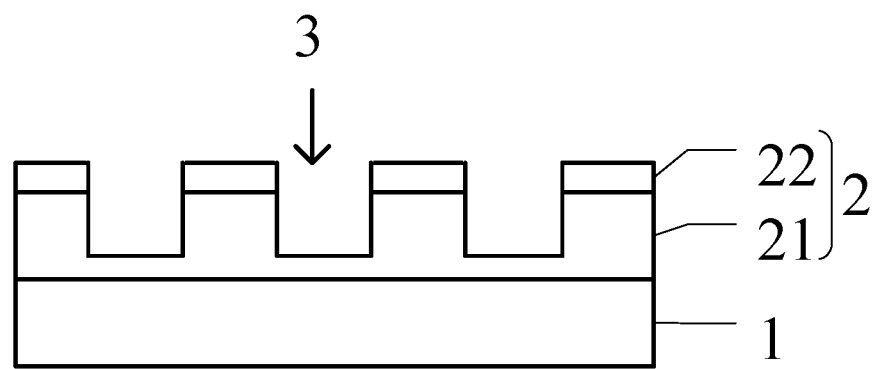
FIG. 3 is a cross-sectional diagram of a bezel area formed with an opening provided by an embodiment of the present application.
Figure 6:
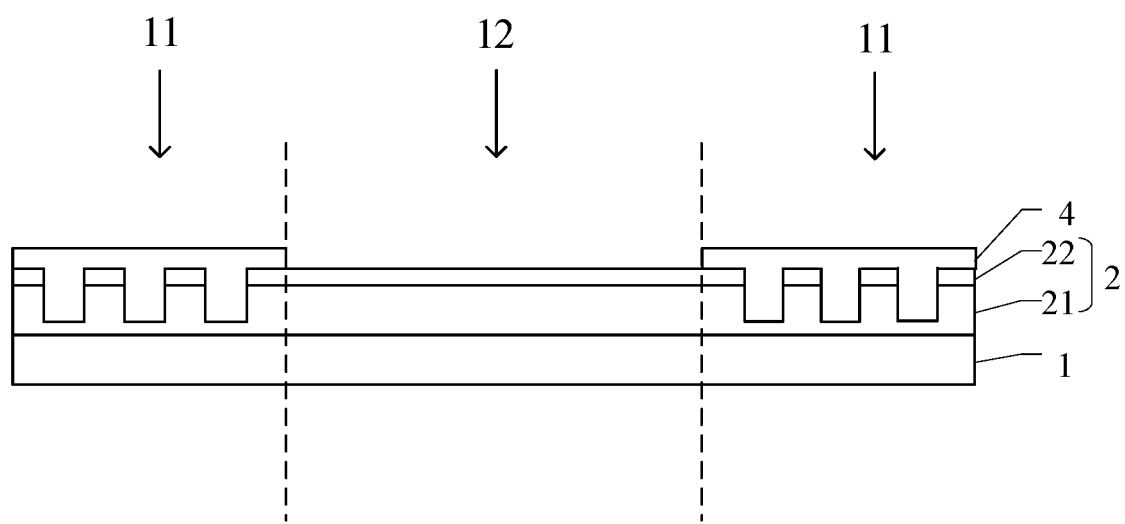
FIG. 6 is a cross-sectional diagram of a conductive laminated structure provided by an embodiment of the present application.
Figure 7:
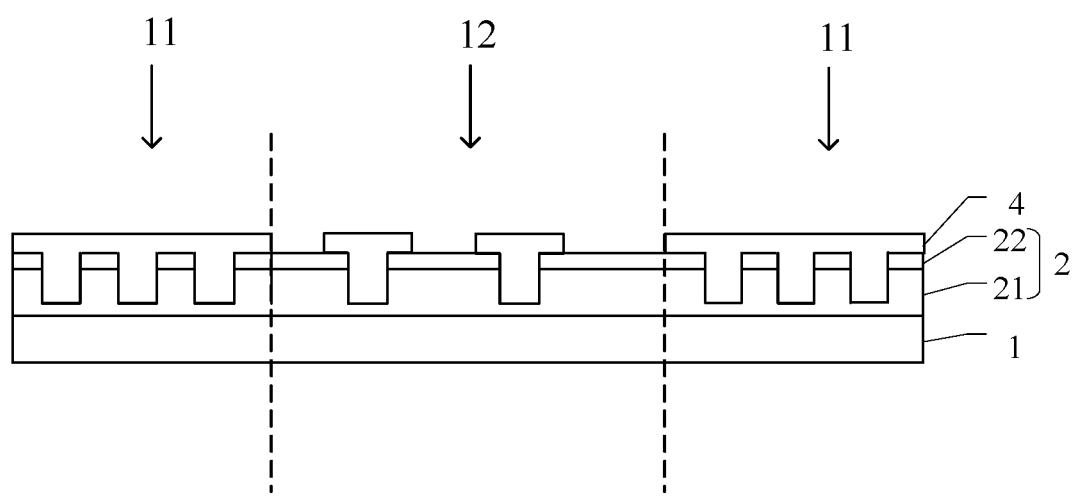
FIG. 7 is another cross-sectional diagram of a conductive laminated structure provided by an embodiment of the present application.

FIG. 7 is a schematic diagram for a conductive laminated structure provided by this embodiment. As shown in FIG. 6 and FIG. 3, the conductive laminated structure includes a conductive layer 2 and a signal connection layer 4; the conductive layer 2 comprises a metal nanowire conductive layer 21 and an adhesion enhancement layer 22, wherein the adhesion enhancement layer 22 and the metal nanowire conductive layer 21 are at least partially embedded into each other in a thickness extending direction of the adhesion enhancement layer 22; the signal connection layer 4 is located on the conductive layer 2, the conductive layer 2 is provided with an opening 3, and at least part of the signal connection layer 4 is embedded into the opening 3 a thickness extending direction of the conductive layer 2.

Specifically, the conductive laminated structure is located on a substrate 1 which includes a viewable area 12 and a bezel area 11. Wherein, the viewable area 12 of the substrate 1 is usually used for light transmission and display, and the bezel area 11 usually does not transmit light, so that the display content of the viewable area 12 can be highlighted and the components such as wirings can be concealed. The conductive layer 2 covers the substrate 1. Furthermore, the conductive layer 2 comprises a metal nanowire conductive layer 21 and an adhesion enhancement layer 22, the metal nanowire conductive layer 21 comprises a matrix and a plurality of metal nanowires which are embedded into the matrix and lap-jointed with one another to form a conductive network. The adhesion enhancement layer 22 is at least partially embedded in the metal nanowire conductive layer 21, so as to increase the adhesion between the metal nanowire conductive layer 21 and the substrate 1. In this embodiment, acrylate oligomer is coated on the surface of the metal nanowire conductive layer 21 and cured to form the adhesion enhancement layer 22.

Referring to FIG. 7 and FIG. 3, the opening 3 may be located in the bezel area 11 or in the viewable area 12, or in both the bezel area 11 and the viewable area 12, the opening 3 is used for electrically connecting the metal nanowires in the metal nanowire conductive layer 21 with the signal connection layer 4 to a larger extent. The signal connection layer 4 is at least partially embedded into the opening 3 along a thickness extending direction of the signal connection layer, thereby increasing the lap-jointed area of the metal nanowire conductive layer 21 with the signal connection layer 4, which in turn increases conductivity.

Furthermore, the opening 3 being located in the bezel area 11 will be taken as an example in a detailed description in this specification.

Referring to FIG. 6 and FIG. 3, an opening 3 is provided in the conductive layer 2 of the bezel area 11, so that the metal nanowires in the metal nanowire conductive layer 21 is exposed not only from the surface of the adhesion enhancement layer 22, but also from the opening 3. Specifically, the signal connection layer 4 covers the conductive layer 2 of the bezel area 11, and thus is lap jointed with the metal nanowires exposed from the surface of the adhesion enhancement layer 22; also, the signal connection layer 4 is at least partially embedded into the opening 3 along a thickness extending direction of the signal connection layer, and thus is lap jointed with the metal nanowires exposed from the opening 3. The existence of the opening 3 increases the lap-jointed area of the signal connection layer 4 with the metal nanowire conductive layer 21, which in turn reduces the impedance and increases the conductivity.

Figure 4:
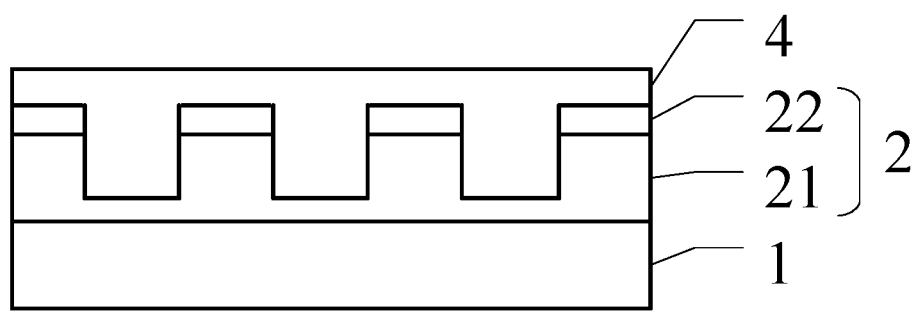
FIG. 4 is a cross-sectional diagram of a bezel area of the conductive laminated structure provided by an embodiment of the present application.
Figure 5:
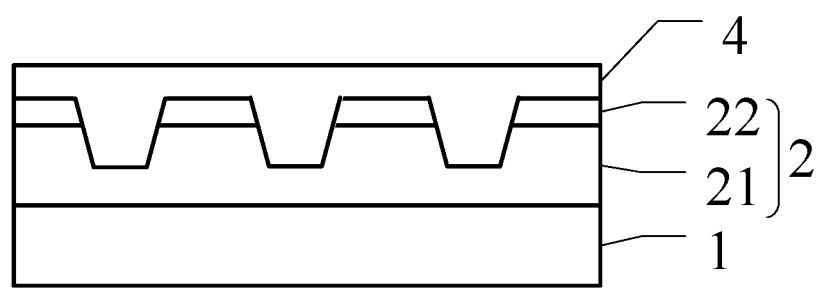
FIG. 5 is another cross-sectional diagram of a bezel area of the conductive laminated structure provided by an embodiment of the present application.

Furthermore, as shown in FIG. 3 and FIG. 4, the vertical section of the opening 3 may has a rectangular shape, i.e., the opening 3 is of the same size at the top and at the bottom, and it is easy to manufacture the rectangular-sectioned opening 3 in an easily controllable process. Wherein, the vertical section of the opening 3 refers to a section perpendicular to the plane along which the conductive layer 2 extends. As shown in FIG. 3 and FIG. 5, the vertical section of the opening 3 may also have a trapezoidal shape, i.e., the opening 3 has a larger size at the top than at the bottom, thereby enabling even more of the metal nanowires to be exposed from the opening 3 and thus ensuring a greater lap-jointed area of the metal nanowires with the signal connection layer 4. Certainly, the opening 3 may also have a cylindrical shape, a conical shape or other shapes, on which no limitation is imposed in the present application. In this specification, the shape of the vertical section refers to the cross-sectional shape of the opening 3, that is, the shape shown in FIGS. 4-5, after sectioning perpendicular to the extending direction of the substrate 1. In this embodiment, the opening 3 does not pass through the conductive layer 2, i.e., the opening 3 has a depth smaller than the thickness of the conductive layer 2. In other embodiments, the opening 3 may also pass through the conductive layer 2, i.e., the opening 3 may have a depth equal to the thickness of the conductive layer 2, the example of which is not illustrated herein.

Optionally, the substrate 1 is rectangular, the bezel area 11 is located in an edge area of the substrate 1 and is of an annular shape, a plurality of openings 3 as described above may be evenly distributed in the conductive layer 2 of the bezel area 11 having an annular shape, thereby enabling the signal connection layer 4 to be evenly lap jointed with the metal nanowire conductive layer 21. Certainly, the openings 3 can also be randomly distributed in the conductive layer 2 of the bezel area 11. In the width direction of one side region of the bezel area 11, there may be one opening 3 or multiple openings 3, and the plurality of openings 3 may be distributed in multiple rows or columns.

Referring to FIGS. 1-7, including a flow chart of a method for manufacturing a conductive laminated structure and cross-section diagrams of the conductive laminated structure as provided by this embodiment, wherein, the method for manufacturing the conductive laminated structure comprises:

S1: forming a conductive layer 2 comprising a metal nanowire conductive layer 21 and an adhesion enhancement layer 22, wherein the adhesion enhancement layer 22 and the metal nanowire conductive layer 21 are at least partially embedded into each other along a thickness extending direction of the adhesion enhancement layer 22;

S2: forming an opening 3 in the conductive layer 2; and

S3: forming a signal connection layer 4 on the conductive layer 2, wherein at least part of the signal connection layer 4 is embedded into the opening 3 along a thickness extending direction of the signal connection layer 4.

Figure 1:
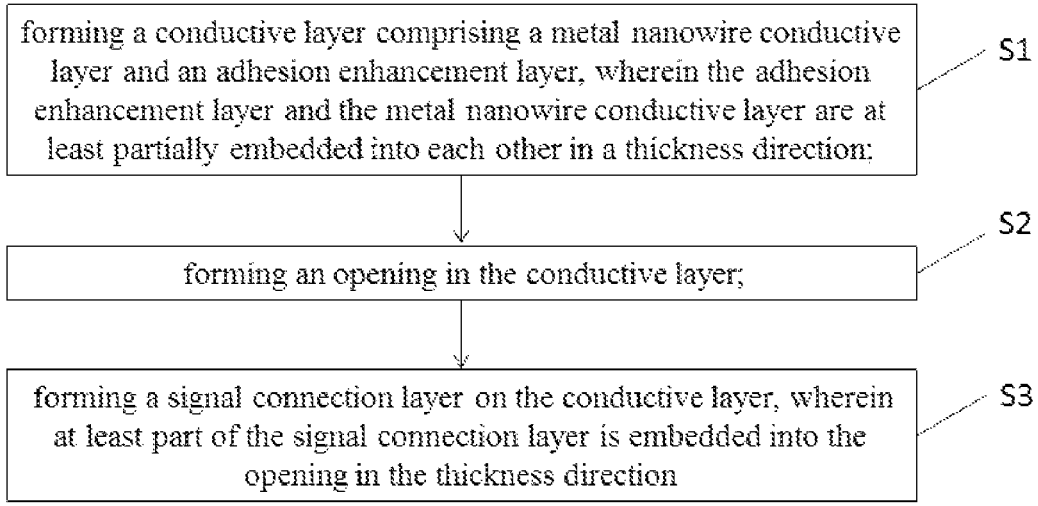
FIG. 1 is a flow chart of a method for manufacturing a conductive laminated structure provided by an embodiment of the present application.
Figure 2:
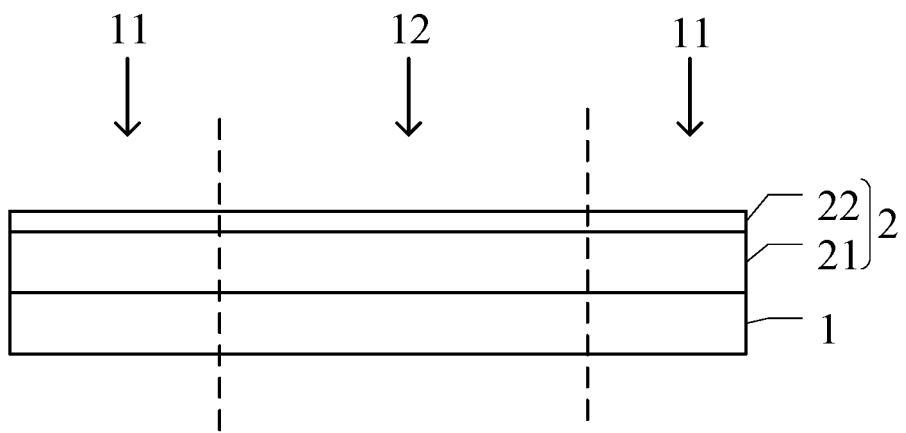
FIG. 2 is a cross-sectional diagram of a status when a conductive layer has been formed on a substrate provided by an embodiment of the present application.

Specifically, referring to FIG. 2, firstly providing a substrate 1 which provides support for the entire conductive laminated structure. Optionally, the substrate 1 may be a rigid substrate made of a glass, metal or ceramic material, etc., or may be a flexible substrate made of any suitable insulating material, such as polyimide (PI), polycarbonate (PC), polyether sulfone (PES), polybutylene terephthalate (PBT), polystyrene (PS) or glass fibre reinforced plastics, on which no limitation is imposed by the present application.

Next, a metal nanowire solution is coated on the substrate 1, the metal nanowire solution is a suspension solution formed by metal nanowires dissolved in a particular solvent. The solvent may be water, an aqueous solution, an ionic solution, a saline solution, a supercritical fluid, oil, or a mixture thereof. The solvent may further contain an additive such as a dispersant, a surfactant, a cross-linking agent, a stabilizer, a wetting agent, or a thickener. The metal nanowire solution is coated on the substrate 1 and heated for drying, so as to cure the metal nanowire solution coated on the substrate 1 to form the metal nanowire conductive layer 21. The metal nanowire conductive layer 21 comprises a matrix and metal nanowires embedded into the matrix, the metal nanowires form a conductive network through lap-joint via molecular force between one another, and the matrix is used to protect the metal nanowires from influence of external environment, such as corrosion, wear, etc.

The metal nanowires 22 may be nanowires of gold (Au), silver (Ag), platinum (Pt), copper (Cu), cobalt (Co), palladium (Pd). Because silver has features such as good electrical conductivity and light transmittance, the metal nanowires are preferably silver nanowires (i. e. nano silver wires).

Furthermore, an adhesion enhancement layer 22 is formed on the metal nanowire conductive layer 21. Wherein, the metal nanowire conductive layer 21 and the adhesion enhancement layer 22 together form the conductive layer 2. Optionally, the material of the adhesion enhancement layer 3 may be one or more of high molecular polymer, resin, optical clear adhesive, oxides, and photoresist analogues. In this embodiment, the material of the adhesion enhancement layer 22 is optical clear adhesive. In this embodiment, the step of forming the adhesion enhancement layer 22 may be: coating an optical clear adhesive solution on the metal nanowire conductive layer 21 by a spraying process or a printing process; and performing heating and drying to cure the optical clear adhesive solution on the metal nanowire conductive layer 21 to form the adhesion enhancement layer 22. Furthermore, because the optical clear adhesive solution has fluidity and the metal nanowire conductive layer 21 has a network structure, before curing of the optical clear adhesive solution, the optical clear adhesive solution tends to permeate into the metal nanowire conductive layer 21, thereby allowing the adhesion enhancement layer 22 formed after the curing to be at least partially embedded into the metal nanowire conductive layer 21 along a thickness extending direction of the signal connection layer. Therefore, the metal nanowire conductive layer 21 is better attached onto the substrate 1, and shifting does not easily happen among the metal nanowires, resulting in firmer lap-joint.

Next, referring to FIG. 3, the opening 3 in the conductive layer 2 is formed by a method selected from at least one of dry etching, wet etching and laser etching. In this embodiment, a dry etching process is used to etch the conductive layer 2 in the bezel area 11 to form the opening 3. Furthermore, the etching parameters of the dry etching process can be adjusted as practically required by the conductive laminated structure, so as to change the shape and depth of the opening 3, for making the conductivity performance of the conductive laminated structure better. Understandably, the opening 3 can also be formed in the conductive layer 2 of the viewable area 12.

Next, as shown in FIG. 4 or FIG. 5, a signal connection layer 4 is formed on the conductive layer 2 by using a printing process. In this embodiment, the signal connection layer 4 is formed on the conductive layer 2 of the bezel area 11. The material of the signal connection layer 4 may be one or more of silver, gold, tin indium oxide, metallic sieve or graphene. In this embodiment, conductive silver pulp is printed on the conductive layer 2 of the bezel area 11 to form the signal connection layer 4. During the printing, the conductive silver pulp with fluidity would flow into the opening 3, and thus the formed signal connection layer 4 is at least partially embedded into the opening 3 along a thickness extending direction of the signal connection layer, thereby increasing the effective contact area of the metal nanowire conductive layer 21 with the signal connection layer 4, therefore, the conductivity can be ensured while reducing the overall area percentage of the bezel area, so as to meet the design requirement for a narrow bezel.

Optionally, in this embodiment, after forming the signal connection layer 4, a laser etching process is further adopted to etch the signal connection layer 4, so as to form a plurality of signal connection lines on the metal nanowire conductive layer 2 of the bezel area 11; then the bezel area 11 is covered, and the conductive layer 2 of the viewable area 12 is etched, so that touch-control electrodes are formed in the viewable area 12, and the plurality of signal connection lines are lap-jointed with the touch-control electrodes by a subsequent process.

On such basis, referring to FIG. 7, the present embodiment further provides a touch-control display device, which comprises a substrate 1 and the conductive laminated structure. Wherein, the conductive laminated structure comprises: a conductive layer comprising a metal nanowire conductive layer and an adhesion enhancement layer, wherein the adhesion enhancement layer and the metal nanowire conductive layer are at least partially embedded into each other along a thickness extending direction of the adhesion enhancement layer; and a signal connection layer located on the conductive layer, wherein the conductive layer is provided with an opening, and at least part of the signal connection layer is embedded into the opening along a thickness extending direction of the signal connection layer.

It should be noted that, structural details of the conductive laminated structure that are not specifically described in this embodiment can refer to the description of the embodiments illustrated in FIG. 1 to FIG. 6, which will not be redundantly described herein.

Optionally, the touch-control display device further includes a cover plate and a bonding layer, the bonding layer is located between the conductive laminated structure and the cover plate so as to bond the conductive laminated structure and the cover plate together. The cover plate of the bezel area 11 can be coated with an opaque decoration material to highlight the image displayed in the viewable area 12.

Optionally, as shown in FIG. 6, that both the signal connection layer 4 and the opening 3 being able to be located in a bezel area 11 can increase the effective lap jointed area of the signal connection layer with the metal nanowire conductive layer in the bezel area, thus ensuring the conductivity of the touch-control display device while reducing the overall area percentage of the bezel area 11, so as to meet the design requirement for a narrow bezel.

In conclusion, in the conductive laminated structure and the method for manufacturing the same, and the touch-control display device provided by the embodiments of the present application, the opening is formed in the conductive layer after the conductive layer is formed on the substrate, so that more of the metal nanowires in the metal nanowire conductive layer can be exposed out of the surface of the adhesion enhancement layer and get in contact with the signal connection layer, furthermore, at least part of the signal connection layer is embedded into the opening along a thickness extending direction of the signal connection layer, thus ensuring the adhesiveness while enlarging the lap jointed area of the signal connection layer with the metal nanowire conductive layer, which in turn reduces impedance and increases conductivity, and thereby further reduces response time; also, the conductivity can be ensured while reducing the overall area percentage of the bezel area, so as to meet the design requirement for a narrow bezel.

The above description, which is only about preferable embodiments of the present application, is by no means to impose any limitation on the present application. Any form of equivalent substitution or modification to the technical solution and contents disclosed by the present application, made by a person with ordinary skill in the art without departing from the scope of the technical solution of the present application, belongs to the contents of the technical solution of the present application and still falls into the protection scope of the present application.

The invention claimed is:

1. A conductive laminated structure, comprising:
   a conductive layer, comprising a metal nanowire conductive layer and an adhesion enhancement layer disposed on the metal nanowire conductive layer, wherein the adhesion enhancement layer and the metal nanowire conductive layer are at least partially embedded into each other along a thickness extending direction of the adhesion enhancement layer; and
   a signal connection layer, located on the adhesion enhancement layer of the conductive layer, wherein the conductive layer is provided with an opening, the depth of the opening is smaller than the thickness of the conductive layer, the opening extends through the adhesion enhancement layer and partially into the metal nanowire conductive layer, and at least part of the signal connection layer is embedded into the opening along a thickness extending direction of the signal connection layer.

2. The conductive laminated structure according to claim 1, wherein one side of a vertical section of the opening near the signal connection layer has a size larger than that of the other side of the vertical section of the opening away from the signal connection layer.

3. The conductive laminated structure according to claim 2, wherein the vertical section of the opening has a trapezoidal shape.

4. The conductive laminated structure according to claim 1, wherein the vertical section of the opening has a rectangular shape.

5. The conductive laminated structure according to claim 1, wherein a plurality of the openings are provided and evenly distributed in the conductive layer.

6. The conductive laminated structure according to claim 5, wherein the plurality of the openings are distributed in multiple rows or columns.

7. The conductive laminated structure according to claim 1, wherein the metal nanowire conductive layer comprises:
a matrix; and
a plurality of metal nanowires embedded in the matrix; the plurality of metal nanowires are lap-jointed with one another to form a conductive network.

8. The conductive laminated structure according to claim 1, wherein the material of the adhesion enhancement layer is at least one of high molecular polymer, resin, transparent optical adhesive, oxides, and photoresist analogues.

9. The conductive laminated structure according to claim 1, wherein the material of the signal connection layer is at least one of silver, gold, tin indium oxide, metallic sieves and graphene.

10. The conductive laminated structure according to claim 7, wherein the material of the metal nanowires is gold, silver, platinum, copper, cobalt or palladium.

11. A method for manufacturing a conductive laminated structure, comprising:
forming a conductive layer comprising a metal nanowire conductive layer and an adhesion enhancement layer disposed on the metal nanowire conductive layer, wherein the adhesion enhancement layer and the metal nanowire conductive layer are at least partially embedded into each other along a thickness direction of the adhesion enhancement layer;
forming an opening in the conductive layer; and
forming a signal connection layer on the adhesion enhancement layer of the conductive layer, wherein the depth of the opening is smaller than the thickness of the conductive layer, the opening extends through the adhesion enhancement layer and partially into the metal nanowire conductive layer, wherein at least part of the signal connection layer is embedded into the opening along a thickness extending direction of the signal connection layer.

12. The method according to claim 11, wherein, the step of forming the metal nanowire conductive layer comprises:
coating a metal nanowire solution on a substrate; and
curing the metal nanowire solution to form the metal nanowire conductive layer.

13. The method according to claim 11, wherein the step of forming the adhesion enhancement layer comprises:
coating an optical clear adhesive solution on the metal nanowire conductive layer by a spraying process or a printing process; and
performing heating and drying to cure the optical clear adhesive solution to form the adhesion enhancement layer.

14. The method according to claim 11, wherein the opening in the conductive layer is formed by a method selected from at least one of dry etching, wet etching and laser etching.

15. The method according to claim 11, wherein the signal connection layer on the conductive layer is formed by a printing process.

16. A touch-control display device, comprising:
a substrate;
a conductive laminated structure, located on the substrate; wherein the conductive laminated structure comprises:
a conductive layer, comprising a metal nanowire conductive layer and an adhesion enhancement layer disposed on the metal nanowire conductive layer, the adhesion enhancement layer and the metal nanowire conductive layer being at least partially embedded into each other along a thickness extending direction of the adhesion enhancement layer; and
a signal connection layer, located on the adhesion enhancement layer of the conductive layer, the conductive layer being provided with an opening, the depth of the opening being smaller than the thickness of the conductive layer, the opening extending through the adhesion enhancement layer and partially into the metal nanowire conductive layer, at least part of the signal connection layer being embedded into the opening along a thickness extending direction of the signal connection layer.

17. The touch-control display device according to claim 16, wherein, the substrate comprises a viewable area and a bezel area surrounding the viewable area, the signal connection layer and the opening are provided in the bezel area.

18. The touch-control display device according to claim 17, wherein the signal connection layer and the opening are also provided in the viewable area.

19. The touch-control display device according to claim 16, further comprising a cover plate and a bonding layer, the bonding layer is located between the conductive laminated structure and the cover plate so as to bond the conductive laminated structure and the cover plate together.

* * * * *